United States Patent
Shih

(10) Patent No.: US 7,595,786 B2
(45) Date of Patent: Sep. 29, 2009

(54) ILLUMINATION SYSTEM AND ILLUMINATION CONTROL METHOD FOR ADAPTIVELY ADJUSTING COLOR TEMPERATURE

(75) Inventor: Cheng-Chung Shih, Fremont, CA (US)

(73) Assignee: Capella Microsystems, Corp., Tortola (VG)

( * ) Notice: Subject to any disclaimer, the term of this patent is extended or adjusted under 35 U.S.C. 154(b) by 0 days.

(21) Appl. No.: 11/979,959

(22) Filed: Nov. 13, 2007

(65) Prior Publication Data

US 2009/0121641 A1      May 14, 2009

(51) Int. Cl.
G09G 3/36      (2006.01)
H05B 37/02      (2006.01)

(52) U.S. Cl. ............................. 345/102; 345/82; 345/76; 345/77; 345/84; 315/158; 315/149; 315/312; 315/308

(58) Field of Classification Search ......... 315/149–159, 315/224, 225, 291, 307–311, 312–326, 185 S; 345/102, 82, 76, 77, 84
See application file for complete search history.

(56) References Cited

U.S. PATENT DOCUMENTS

2002/0017880 A1* 2/2002 Dickie ......................... 315/291
2007/0268241 A1* 11/2007 Nitta et al. ................... 345/102

* cited by examiner

Primary Examiner—Tuyet Vo
(74) Attorney, Agent, or Firm—Rosenberg, Klein & Lee

(57) ABSTRACT

This invention discloses an illumination method and an illumination control method. An embodiment of the illumination system includes two light detection modules for detecting a light produced by a light emitting diode and an ambient light, calculating a reference spectral distribution based on a detection result of the ambient light, comparing the detection result of the light emitting diode with the reference spectral distribution, and driving the illumination module to emit a light matching with the reference spectral distribution based on a comparison result. Another embodiment of the illumination system includes a light detection module for periodically switching the light emitting diode to emit light and stop emitting light. When the light emitting diode stops an illumination period, the light detection module detects an ambient light, and when the light emitting diode continues an illumination period, the light detection module detects a light produced by the light emitting diode.

20 Claims, 8 Drawing Sheets

ILLUMINATION SYSTEM AND ILLUMINATION CONTROL METHOD FOR ADAPTIVELY ADJUSTING COLOR TEMPERATURE

BACKGROUND OF THE INVENTION

1. Field of the Invention

The present invention relates to an illumination system and an illumination control method, and more particularly to a technical field of controlling a light emitting diode dynamically based on the detection of ambient light.

2. Description of the Related Art

Please referring to FIG. 1 for a block diagram of an illumination system in accordance with the prior art, the illumination system comprises a control module 11, an illumination module 12 and a light detection module 13. The illumination module 12 comprises a red light emitting diode 121, a green light emitting diode 122 and a blue light emitting diode 123. The control module 11 comprises a microprocessor 111 and three driving modules 113, 114, 115. The driving module 113, 114, 115 generate PWM signals to drive a red light emitting diode 121, a green light emitting diode 122 and a blue light emitting diode 123 to emit lights respectively. The light detection module 13 comprises a red light sensor 131, a green light sensor 132 and a blue light sensor 133, for detecting the intensity of lights produced by the red light emitting diode 121, the green light emitting diode 122 and the blue light emitting diode 123 respectively. The microprocessor 111 compares the detection results of these optical sensors with a predetermined spectral distribution 112 and controls the driving module 113, 114, 115 to adjust the intensity of lights produced by the light emitting diodes 121, 122, 123 based on the comparison results respectively. For example, the microprocessor 11 can control the length or proportion of a duty cycle of a PWM signal generated by the driving module to change the illumination intensity of the light emitting diodes.

With the foregoing technical content, the illumination system in accordance with the prior art can emit a light matching with the predetermined spectral distribution 112. Even if some of the light emitting diodes have a drop of illumination intensity caused by a temperature factor or aged material, the microprocessor 11 still can adjust the PWM signal to improve the illumination intensity of these light emitting diodes, and further maintain the light produced by the illumination module 12 to match with the predetermined spectral distribution 112. For instance, if the illumination system is applied to an LCD screen, the light on the screen is maintained as white light to provide comfortable viewing for users. However, if the color temperature of the ambient light is changed, for example a bulb having higher color temperature is used in a room, and emits a slightly red light, so that the screen will show a slightly red phenomenon even if the foregoing illumination system is used. If a bulb having a lower color temperature is used in a room, and emits a slightly blue light, and the screen will show a slightly blue phenomenon, and thus the colors of an image cannot be displayed correctly.

In view of the drawbacks of the prior art, the inventor of the present invention based on years of experience in the related field to propose an illumination method and an illumination control method to overcome the foregoing drawbacks of the prior art.

SUMMARY OF THE INVENTION

Therefore, it is one of objective of the present invention to provide an illumination system and an illumination control method to maintain good performance of the illumination system in different ambient lights environment for overcoming the foregoing drawbacks of the prior art.

To achieve the foregoing objective, the present invention provides an illumination system comprising an illumination module, a control module, a first light detection module and a second light detection module. The control module is provided for driving the illumination module to emit light. The first light detection module is provided for detecting the light produced by the illumination module to produce a first detection result, and the second light detection module is provided for detecting an ambient light to produce a second detection result. The control module is provided for calculating a reference spectral distribution at least based on the second detection result, and comparing the first detection result with the reference spectral distribution, and then driving the illumination module to emit a light matching with the reference spectral distribution based on the comparison result.

The invention further provides an illumination system comprising an illumination module, a control module and a light detection module. The control module is provided for controlling the illumination module to emit light or not to emit light. While the illumination module is emitting light, the light detection module is provided for detecting the light produced by the illumination module to produce a first detection result. While the illumination module is not emitting light, the light detection module is provided for detecting an ambient light to produce a second detection result. The control module is provided for calculating a reference spectral distribution at least based on the second detection result, and comparing the first detection result with the reference spectral distribution, and then driving the illumination module to emit a light matching with the reference spectral distribution based on the comparison result.

In addition, the present invention further provides an illumination control method comprising the steps of: detecting an ambient light to produce a first detection result; calculating a reference spectral distribution at least based on the first detection result; detecting the light produced by the illumination module to produce a second detection result; comparing the second detection result with the reference spectral distribution to drive the illumination module to emit a light matching with the reference spectral distribution based on the comparison result.

To make it easy for our examiner to understand the technical features and effects of the present invention, we use preferred embodiments together with attached drawings for the detailed description of the invention.

BRIEF DESCRIPTION OF THE DRAWINGS

The subject matter regarded as the invention is particularly pointed out and distinctly claimed in the concluding portion of the specification. The invention, both as to system and control method, together with features and advantages thereof may best be understood by reference to the following detailed description with the accompanying drawings in which:

DETAILED DESCRIPTION OF THE PREFERRED EMBODIMENTS

Figure 1:
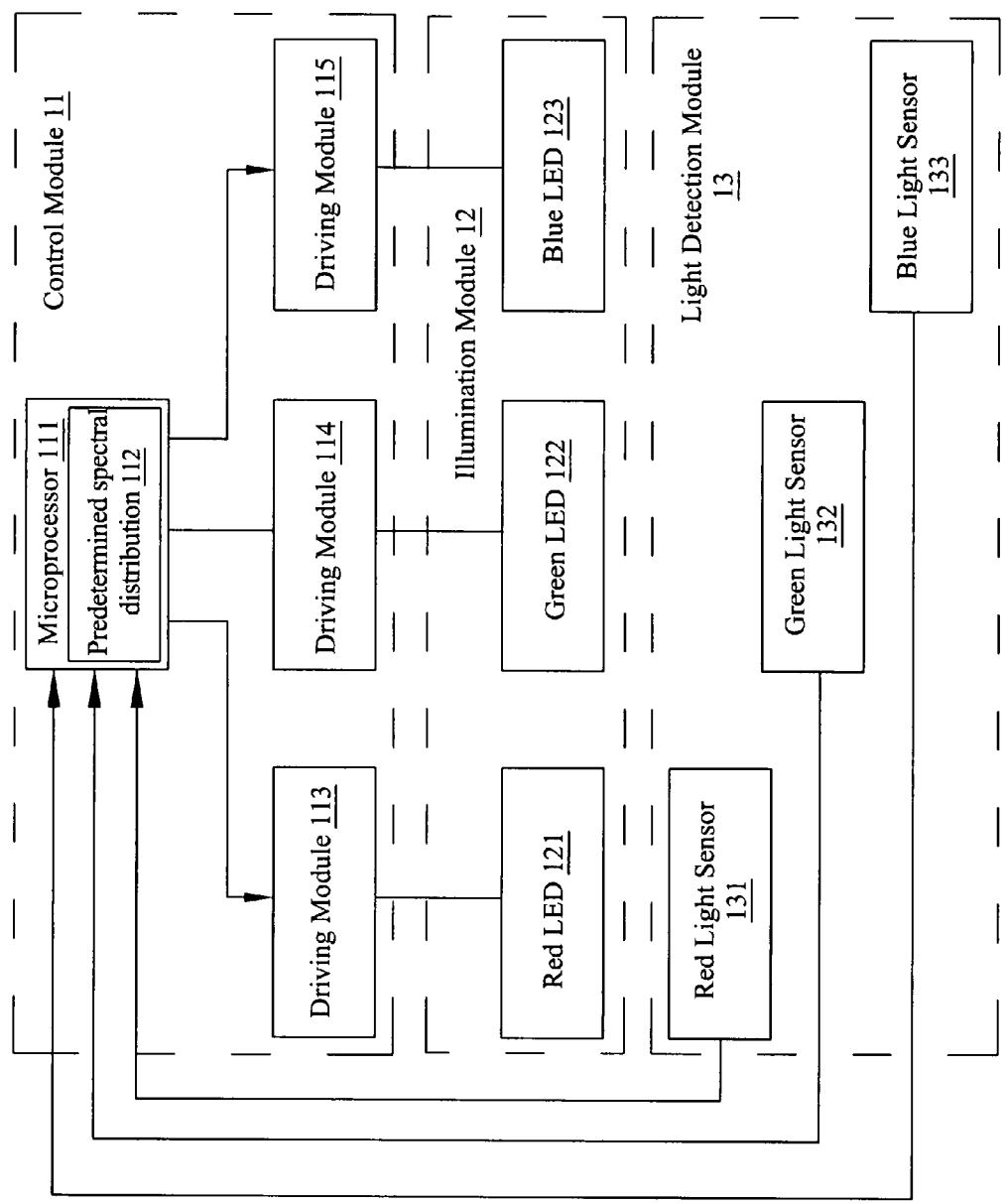
FIG. 1 illustrates a block diagram of an illumination system in accordance with the prior art.

The description of an illumination system and an illumination method in accordance with a preferred embodiment of the present invention will be illustrated by the following figures. Please referring to FIG. 2 for a block diagram of a preferred embodiment of an illumination system in accordance with the present invention, the illumination system 2 comprises a control module 21, an illumination module 22, a first light detection module 23 and a second light detection module 24. The illumination module 22 comprises a red light emitting diode 221, a green light emitting diode 222 and a blue light emitting diode 223, for emitting different lights to be mixed into a desired light, and the control module 21 is provided for driving the illumination module 22 to emit light. In this embodiment, the control module 21 comprises a microprocessor 211 and three driving modules 213, 214, 215. The microprocessor 211 is provided for controlling the driving module to generate a driving signal to the light emitting diode and drive the light emitting diode to emit light. The driving module preferably comprises a PWM signal generator and a switch, and the driving signal is preferably a PWM signal, and the switch is preferably a transistor, and the microprocessor 211 can control the PWM signal generator to generate a PWM signal having a different duty cycle for adjusting the illumination intensity of the light emitting diode. The first light detection module 23 is provided for detecting the light produced by the illumination module 22 to produce a first detection result. The first light detection module 23 includes an optical sensor of a light emitting diode corresponding to different colors such as a red light sensor 231, a green light sensor 232 and a blue light sensor 233 implemented by a filter and a light-dependent resistor.

The second light detection module 24 is provided for detecting an ambient light to produce detection result of the ambient light. In this embodiment, the second light detection module 24 comprises a red light sensor 241, a green light sensor 242 and a blue light sensor 243, for detecting a red light intensity, green light intensity and blue light intensity of the ambient light respectively. The control module 21 calculates a reference spectral distribution at least based on a detection result of the ambient light outputted by the second light detection module 24 and a compensation procedure 212, and compares the first detection result outputted by the first light detection module 23 with the reference spectral distribution, and then drives the illumination module 22 to emit a light matching with the reference spectral distribution based on a comparison result.

Figure 3:
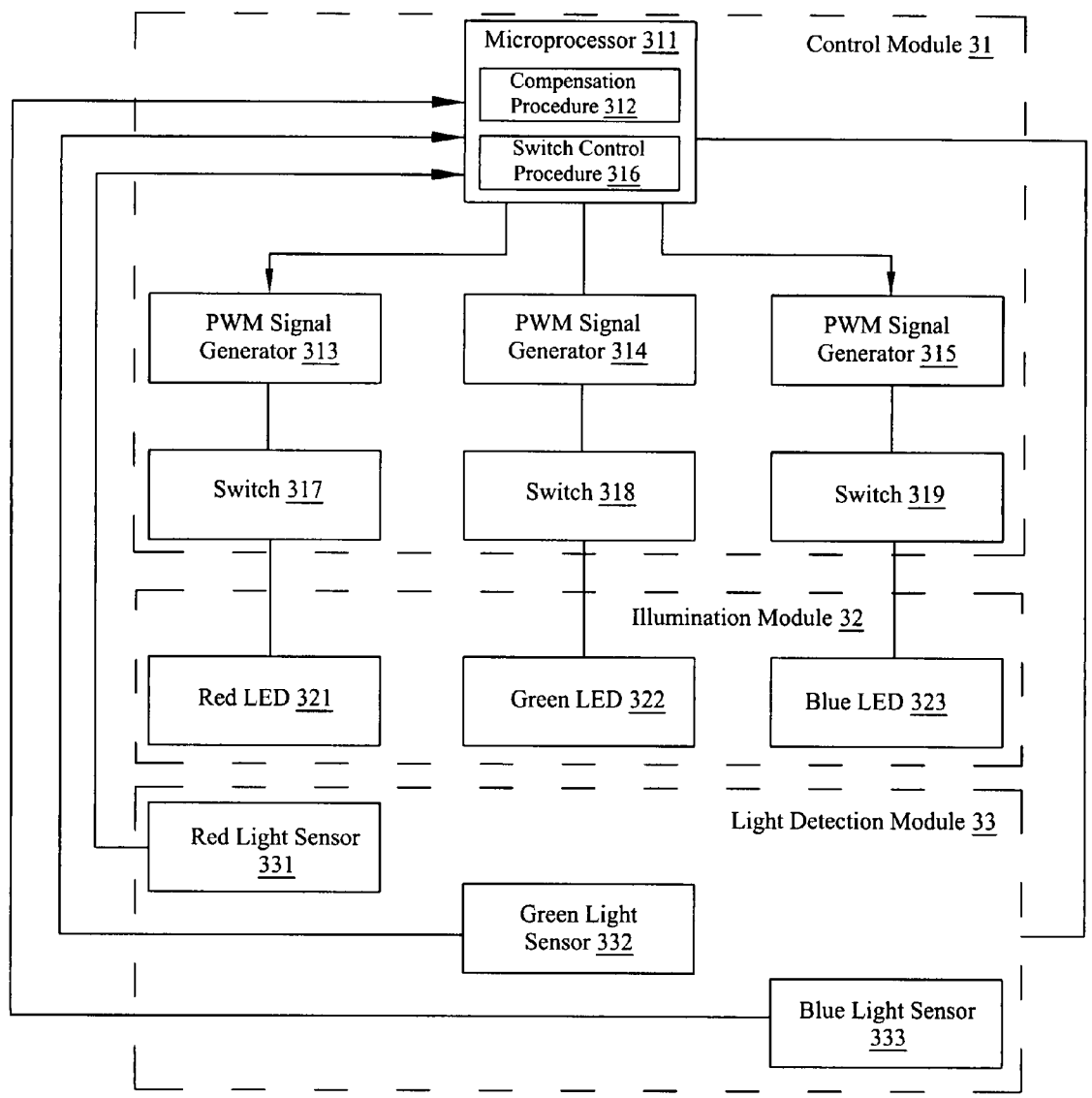
FIG. 3 illustrates a block diagram of other preferred embodiment of an illumination system in accordance with the present invention.

Please referring to FIG. 3 for a block diagram of an illumination system in accordance with another preferred embodiment of the present invention, the illumination system 3 comprises a control module 31, an illumination module 32 and a light detection module 33. The illumination module 32 comprises a red light emitting diode 321, a green light emitting diode 322 and a blue light emitting diode 323. The control module 31 comprises a microprocessor 311, three PWM signal generators 313, 314, 315 and three switches 317, 318, 319. The PWM signal generators 313, 314, 315 produces PWM signals, and the switches 317, 318, 319 are provided for driving the light emitting diodes 321, 322, 323 to emit lights. The microprocessor 311 builds in a compensation procedure 312 and a switch control procedure 316, wherein the microprocessor 311 executes a switch control procedure 316 to control the illumination module 32 to emit light or not emit light. The light detection module 33 comprises a red light sensor 331, a green light sensor 332 and a blue light sensor 333.

While the microprocessor 311 controls the illumination module 32 not to emit light, the microprocessor 311 also controls the light detection module 33 to detect an ambient light, and produce an ambient light detection result which is then transmitted to the microprocessor 311. The microprocessor 311 calculates a reference spectral distribution based on the ambient light detection result and the compensation procedure 312. While the microprocessor 311 controls the illumination module 32 to emit light, the light detection module 33 is controlled to detect a light produced by the illumination module 32 for producing a first detection result which is then transmitted to the microprocessor 311. The microprocessor 311 compares the first detection result with the reference spectral distribution, and drives the illumination module 32 to emit a light matching with the reference spectral distribution based on a comparison result.

The switch control procedure 316 can be any or a combination of the following procedures:

1. A triggered event is used for controlling the illumination module 32 to emit light/not emit light, such as a user manually starting a function of detecting an ambient light, so that the microprocessor 311 will control the illumination module 32 not to emit light, and let the light detection module 33 detect an ambient light.
2. The illumination module 32 is controlled periodically to emit light/not to emit light.
3. The high potential and low potential of the PWM signal are used for controlling the illumination module 32 to emit light/not to emit light.

Figure 4:
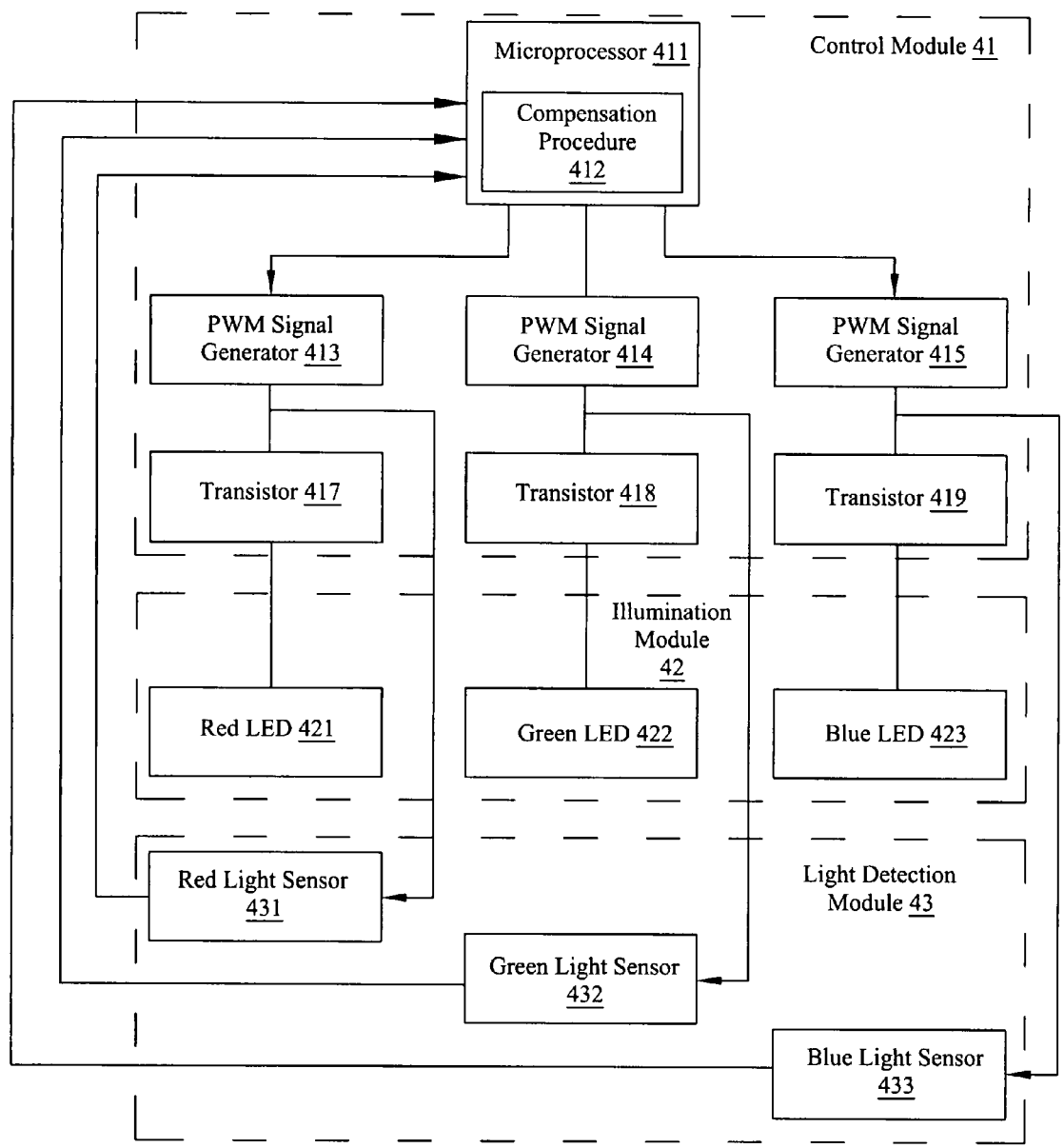
FIG. 4 illustrates a block diagram of another preferred embodiment of an illumination system in accordance with the present invention.

Please referring to FIG. 4 for a block diagram of an illumination system in accordance with a further preferred embodiment of the present invention, the illumination system 4 comprises a control module 41, an illumination module 42 and a light detection module 43. The illumination module 42 comprises a red light emitting diode 421, a green light emitting diode 422 and a blue light emitting diode 423. The control module 41 comprises a microprocessor 411, three PWM signal generators 413, 414, 415 and three transistors 417, 418, 419. The PWM signal generators 413, 414, 415 generate PWM signals, and three transistors 417, 418, 419 are used for driving the light emitting diodes 421, 422, 423 to emit light. The microprocessor 411 builds in a compensation procedure 412. The light detection module 43 comprises a red light sensor 431, a green light sensor 432 and a blue light sensor 433, and the PWM signals generated by the PWM signal generators 413, 414, 415 are transmitted to the red light sensor 431, green light sensor 432 and blue light sensor 433 respectively.

Figure 5:
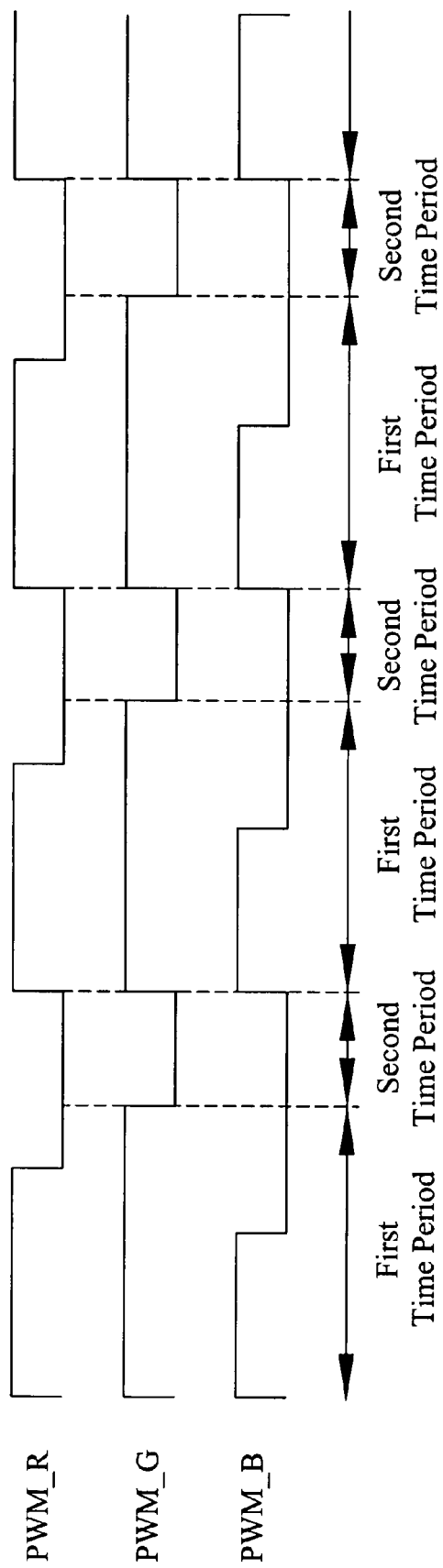
FIG. 5 illustrates a schematic view of a PWM signal of the present invention.

The PWM signal includes a high potential and a low potential, wherein the transistor is electrically conducted at the high potential to pass current through the light emitting diode to drive the light emitting diode to emit light. The transistor is electrically disconnected at a low potential to stop passing current through the light emitting diode, such that the light emitting diode stops emitting light. Therefore, the sensors 431, 432, 433 can selectively detect an ambient light or a light generated by the light emitting diode 421, 422, 423 based on the received PWM signal. Referring to FIG. 5 for a schematic view of a PWM signal of the present invention, the PWM_R stands for the PWM signal generated by the PWM signal generator 413, the PWM_G for the PWM signal generated by the PWM signal generator 414, and the PWM_B for the PWM signal generated by the PWM signal generator 415. Since different light emitting diodes come with different illumination intensities, therefore the ratios of the high potential and the low potential of the PWM_R, the PWM_G and the PWM_B are different. A time period of any one of the three PWM signals at a high potential is used as a first time period, and a time period of three PWM signals at a low potential is used as a second time period. In the first time period, the sensors 431, 432, 433 detect a first detection result of the lights produced by the light emitting diodes 421, 422, 423, and transmits the first detection result to the microprocessor 411. On the other hand, in the second time period, the sensors 431, 432, 433 detect an ambient light to produce an ambient light detection result and transmit the ambient light detection result to the microprocessor 411. The microprocessor 411 calculates a reference spectral distribution based on the ambient light detection result and the compensation procedure 412, and then the microprocessor 411 compares the first detection result with the reference spectral distribution, and drives the illumination module 42 to emit a light matching with the reference spectral distribution based on a comparison result.

Figure 6:
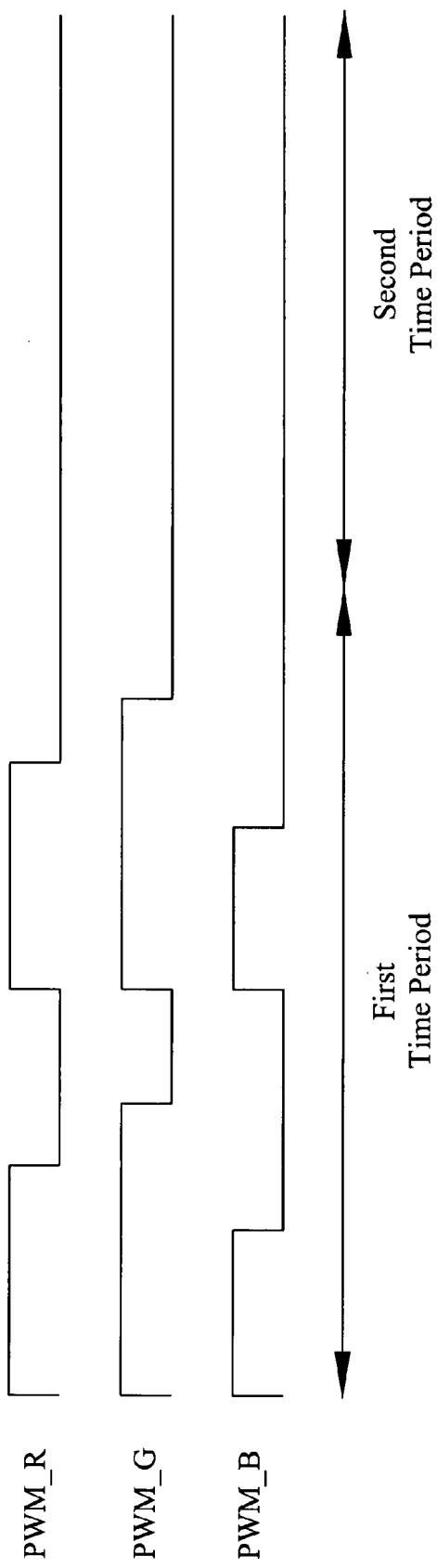
FIG. 6 illustrates a block diagram of PWM signals of further preferred embodiment of an illumination system in accordance with the present invention.

Please referring to FIG. 6 for a block diagram of PWM signals of an illumination system in accordance with a further preferred embodiment of the present invention, the difference of this embodiment with the embodiment illustrated in FIG. 4 resides on that the first time period of this embodiment includes at least one PWM signal, and the sensors 431, 432, 433 in the first time period detect lights produced by the light emitting diodes 421, 422, 423 to produce a first detection result and transmit the first detection result to the microprocessor 411. In the second time period, the PWM signal generators 413, 414, 415 do not generate a PWM signal, such that the transistor is off, no current passes through the light emitting diodes, and the light emitting diodes will stop emitting light. With this switching procedure, the illumination system can use the same set of sensors for alternatively detecting the ambient light and the light of the light emitting diode to perform a later procedure of adjusting the illumination.

The illumination system of the invention can be applied to an LCD screen or an illumination device. For instance, if a user is operating an LCD screen in an environment with a slightly red (or slightly warm) light, the control module will drive the illumination module to emit a slightly blue (or slightly cold) and compensate the slightly red phenomenon caused by the ambient light and allow the LCD screen to display the color of an image correctly. If the LCD screen is situated in an environment with a slightly blue (or slightly cold) light, the control module will drive the illumination module to emit a slightly red (or slightly warm) light to compensate the slightly blue phenomenon caused by the ambient light and allow the LCD screen to display the color of an image correctly.

For example, in a preferred embodiment of a compensation procedure, the following formula is used for calculating the warm light parameter of an ambient light:

$$\text{Warm Light Parameter} = (\text{Red Light Intensity of Ambient Light} \times RF1 - \text{Blue Light Intensity of Ambient Light} \times BF1)/(\text{Red Light Intensity of Ambient Light} \times RF2 + \text{Blue Light Intensity of Ambient Light} \times BF2)$$

where, $RF1$ and $RF2$ are red warm light weight parameters, and $BF1$ and $BF2a$ re blue warm light weight parameter.

The corresponding compensated warm light parameter is calculated based on the warm light parameter of an ambient light. For example, if the warm light parameter of an ambient light is greater than a threshold, then a value lower than the threshold is used as the compensated warm light parameter, and the reference spectral distribution is calculated based on the compensated warm light parameter. In other words, the intensities of the red light, green light and blue light corresponding to the warm light parameters are compensated. Then, the control module adjusts the illumination module to emit a light matching with the reference spectral distribution. In a slightly red ambient light wherein the warm light parameter of the ambient light is relatively higher, then the control module will drive the illumination module to emit a light lower than the warm light parameter, so that such arrangement allows viewers to sense the normal white light without being affected by the ambient light.

In a compensation procedure of another preferred embodiment, the following formula is used for calculating the intensity parameter of the ambient light:

$$\text{Intensity Parameter} = (\text{Red Light Intensity of Ambient Light} \times RF3 + \text{Blue Light Intensity of Ambient Light} \times BF3 + \text{Green Light Intensity of Ambient Light} \times GF3)$$

where $RF3$, $BF3$ and $GF3$ are intensity weight parameters of red, blue and green lights respectively.

The corresponding compensated intensity parameter is calculated based on the intensity parameter of the ambient light. For example, if the intensity parameter of an ambient light is greater than a threshold, then a value smaller than the threshold is used as a compensated intensity parameter, and the reference spectral distribution is calculated based on the compensated intensity parameter, so that the intensities of the red light, green light and blue light corresponding to the intensity parameters can be compensated.

Figure 2:
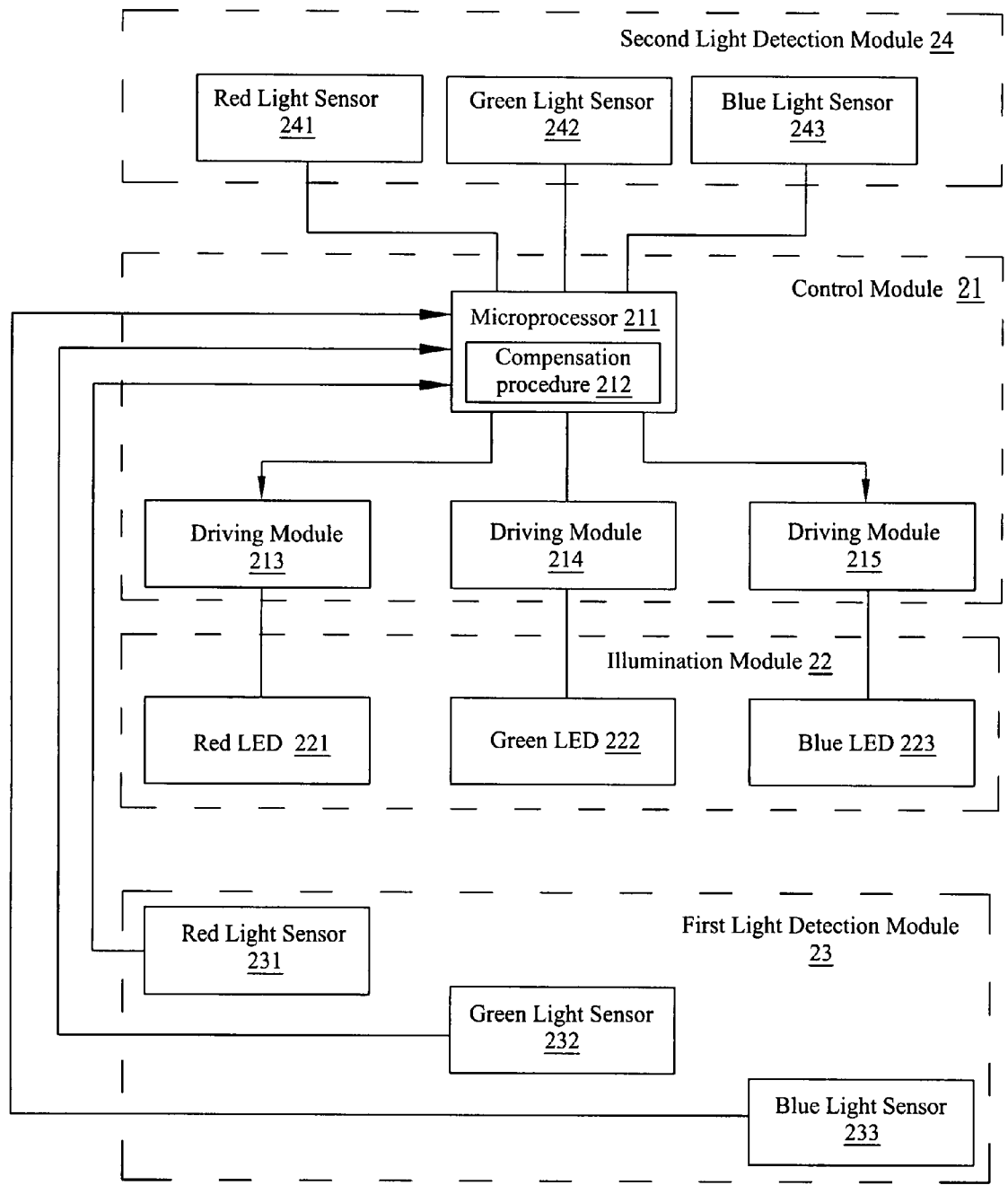
FIG. 2 illustrates a block diagram of a preferred embodiment of an illumination system in accordance with the present invention.
Figure 7:
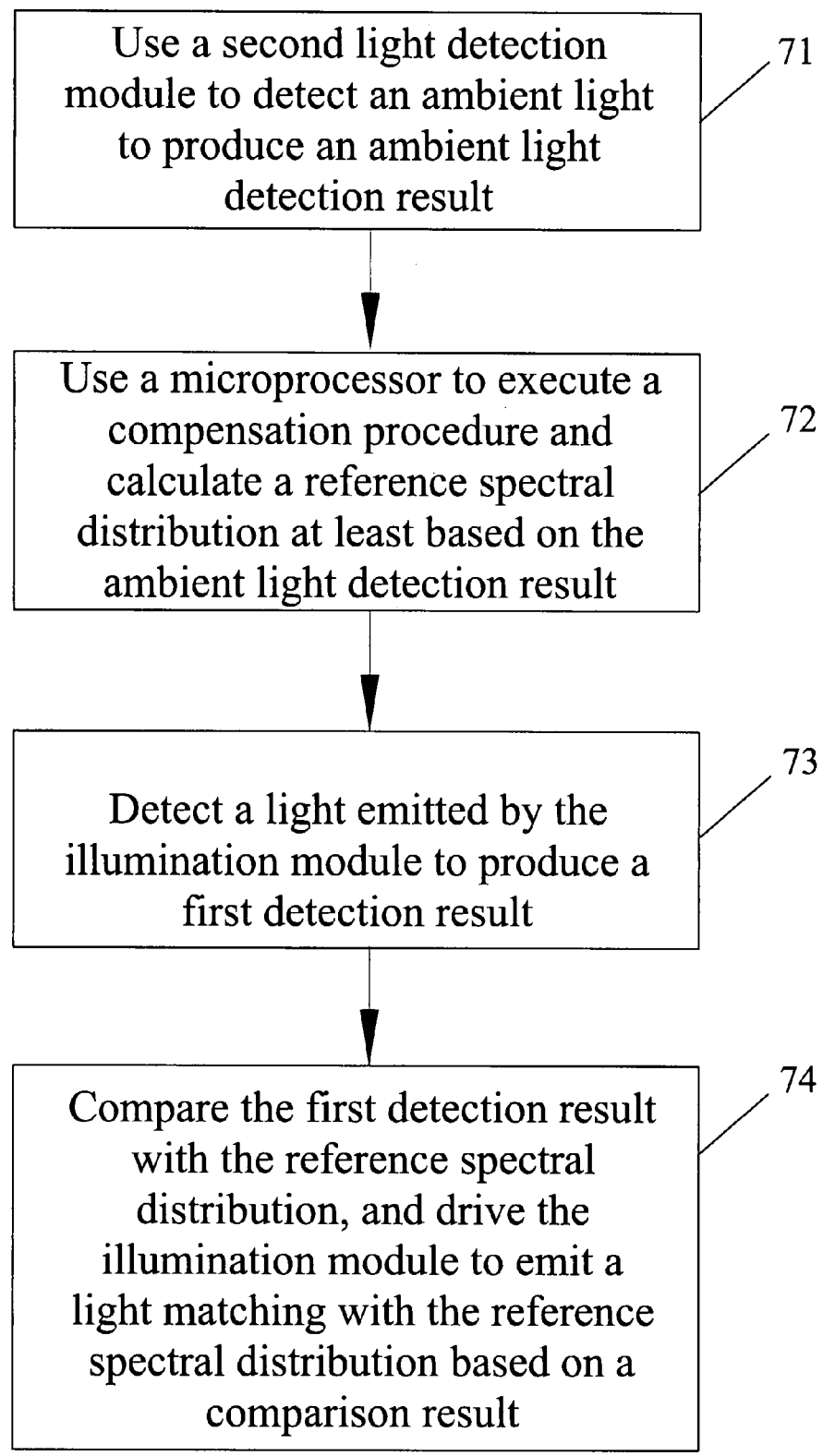
FIG. 7 illustrates a flow diagram of a preferred embodiment of an illumination control method in accordance with the present invention.

Please referring to FIG. 7 for a flow diagram of an illumination control method in accordance with a preferred embodiment of the present invention, the method is corresponsive to the illumination system 2 as illustrated in FIG. 2, and the method comprises the steps of:

Step 71: using a second light detection module 24 to detect an ambient light to produce an ambient light detection result;

Step 72: using a microprocessor 211 to execute a compensation procedure 212, and calculating a reference spectral distribution at least based on the ambient light detection result;

Step 73: detecting a light emitted by the illumination module 22 to produce a first detection result; and Step 74: comparing the first detection result with the reference spectral distribution, and driving the illumination module 22 to emit a light matching with the reference spectral distribution based on a comparison result.

Figure 8:
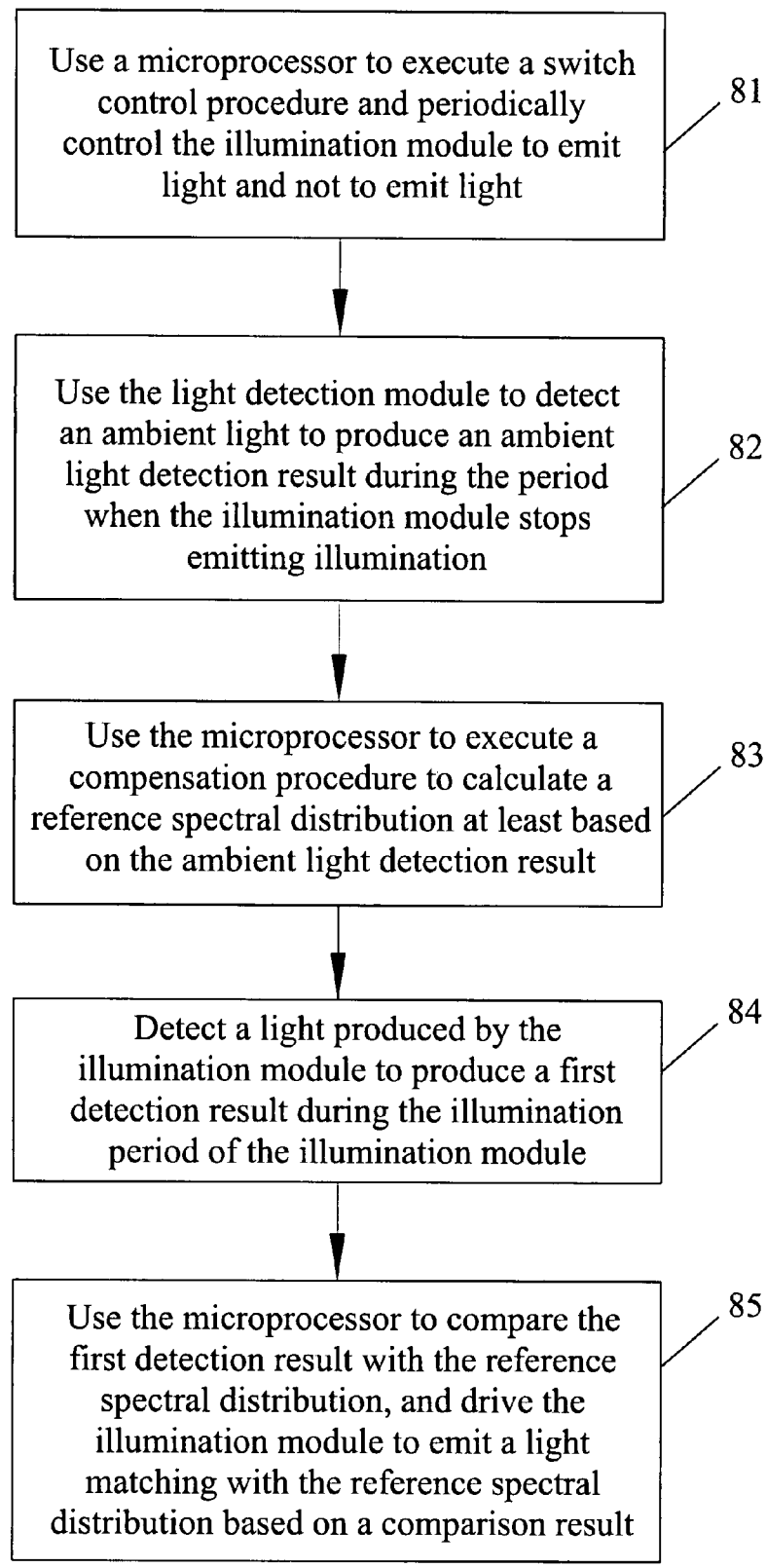
FIG. 8 illustrates a flow diagram of another preferred embodiment of an illumination control method in accordance with the present invention.

Referring to FIG. 8 for a flow diagram of an illumination control method in accordance with another preferred embodiment of the present invention, the method corresponds to the illumination system 3 as illustrated in FIG. 3, and the method comprises the steps of:

Step 81: using a microprocessor 311 to execute a switch control procedure 316, and periodically control the illumination module 32 to emit light and not to emit light;

Step 82: using the light detection module 33 to detect an ambient light to produce an ambient light detection result during the period when the illumination module 32 stops emitting illumination;

Step 83: using the microprocessor 311 to execute a compensation procedure 212 to calculate a reference spectral distribution at least based on the ambient light detection result;

Step 84: detecting a light produced by the illumination module 32 to produce a first detection result during the illumination period of the illumination module 32; and Step 85: using the microprocessor 311 to compare the first detection result with the reference spectral distribution, and driving the illumination module 32 to emit a light matching with the reference spectral distribution based on a comparison result.

While the invention has been described by means of specific embodiments, numerous modifications and variations could be made thereto by those skilled in the art without departing from the scope and spirit of the invention set forth in the claims.

What is claimed is:

1. An illumination system, comprising:
   an illumination module;
   a control module, for driving the illumination module to emit a light;
   a first light detection module, for detecting the light produced by the illumination module to produce a first detection result; and
   a second light detection module, for detecting an ambient light to produce a second detection result;
   wherein, the control module calculates a reference spectral distribution at least based on the second detection result, and compares the first detection result with the reference spectral distribution, and the control module drives the illumination module to emit a light adaptively adjusted in color temperature for matching with the reference spectral distribution based on a comparison result.

2. The illumination system of claim 1, wherein the control module comprises a microprocessor, at least one PWM signal generator and at least one switch.

3. The illumination system of claim 1, wherein the microprocessor executes a compensation procedure, and calculates the reference spectral distribution based on the second detection result.

4. The illumination system of claim 1, wherein the control module is operable to adaptively compensate respective R, Q, B light components for the emitted light, whereby a spectral distribution of the emitted light is adaptively adjusted.

5. The illumination system of claim 1, wherein the first light detection module comprises a filter and an optical sensor.

6. The illumination system of claim 5, wherein the filter is a red light filter, a green light filter or a blue light filter.

7. An illumination system, comprising:
   an illumination module;
   a control module, for controlling the illumination module to emit light or not to emit light; and
   a light detection module, for detecting a light produced by the illumination module to produce a first detection result when the illumination module is emitting light, the light detection module alternatively detecting an ambient light to produce a second detection result when the illumination module is not emitting light;
   wherein, the control module calculates a reference spectral distribution at least based on the second detection result, and compares the first detection result with the reference spectral distribution, and the control module drives the illumination module to emit a light adaptively adjusted in color temperature for matching with the reference spectral distribution based on a comparison result.

8. The illumination system of claim 7, wherein the control module periodically drives the illumination module to enter into an illumination state and a non-illumination state.

9. The illumination system of claim 7, wherein the control module executes a switch control procedure to drive the illumination module into a non-illumination status, and drives the light detection module to detect the ambient light.

10. The illumination system of claim 7, wherein the control module is operable to adaptively compensate respective R, G, B light components for the emitted light, whereby a spectral distribution of the emitted light is adaptively adjusted.

11. The illumination system of claim 7, wherein the first light detection module comprises a filter and an optical sensor.

12. The illumination system of claim 11, wherein the filter is a red light filter, a green light filter or a blue light filter.

13. The illumination system of claim 7, wherein the control module comprises a microprocessor, at least one PWM signal generator and at least one switch.

14. The illumination system of claim 13, wherein the microprocessor is provided for calculating the reference spectral distribution.

15. The illumination system of claim 13, wherein the PWM signal generator generates a PWM signal to the switch and the light detection module.

16. The illumination system of claim 15, wherein the light detection module detects the ambient light to produce the second detection result when the PWM signal is at a low potential, and the light detection module detects a light produced by the illumination module to produce the first detection result when the PWM signal is at a high potential.

17. An illumination control method, for controlling an illumination module to emit a light and the illumination control method comprising the steps of:
   detecting an ambient light, to produce a first detection result;
   calculating a reference spectral distribution at least based on the first detection result;
   detecting the light produced by the illumination module to produce a second detection result;
   comparing the second detection result with the reference spectral distribution, and driving the illumination module to emit a light adaptively adjusted in color temperature for matching with the reference spectral distribution based on a comparison result.

18. The illumination control method of claim 17, further comprising a step of controlling the illumination module to periodically emit light and not emit light.

19. The illumination control method of claim 17, further comprising a step of controlling the illumination module to emit light and not emit light based on a high potential and a low potential for driving a PWM signal of the illumination module.

20. The illumination control method of claim 17, wherein the step of driving the illumination module includes adaptively compensating respective R, G, B light components for the emitted light, whereby a spectral distribution of the emitted light is adaptively adjusted.

* * * * *